UNITED STATES PATENT OFFICE.

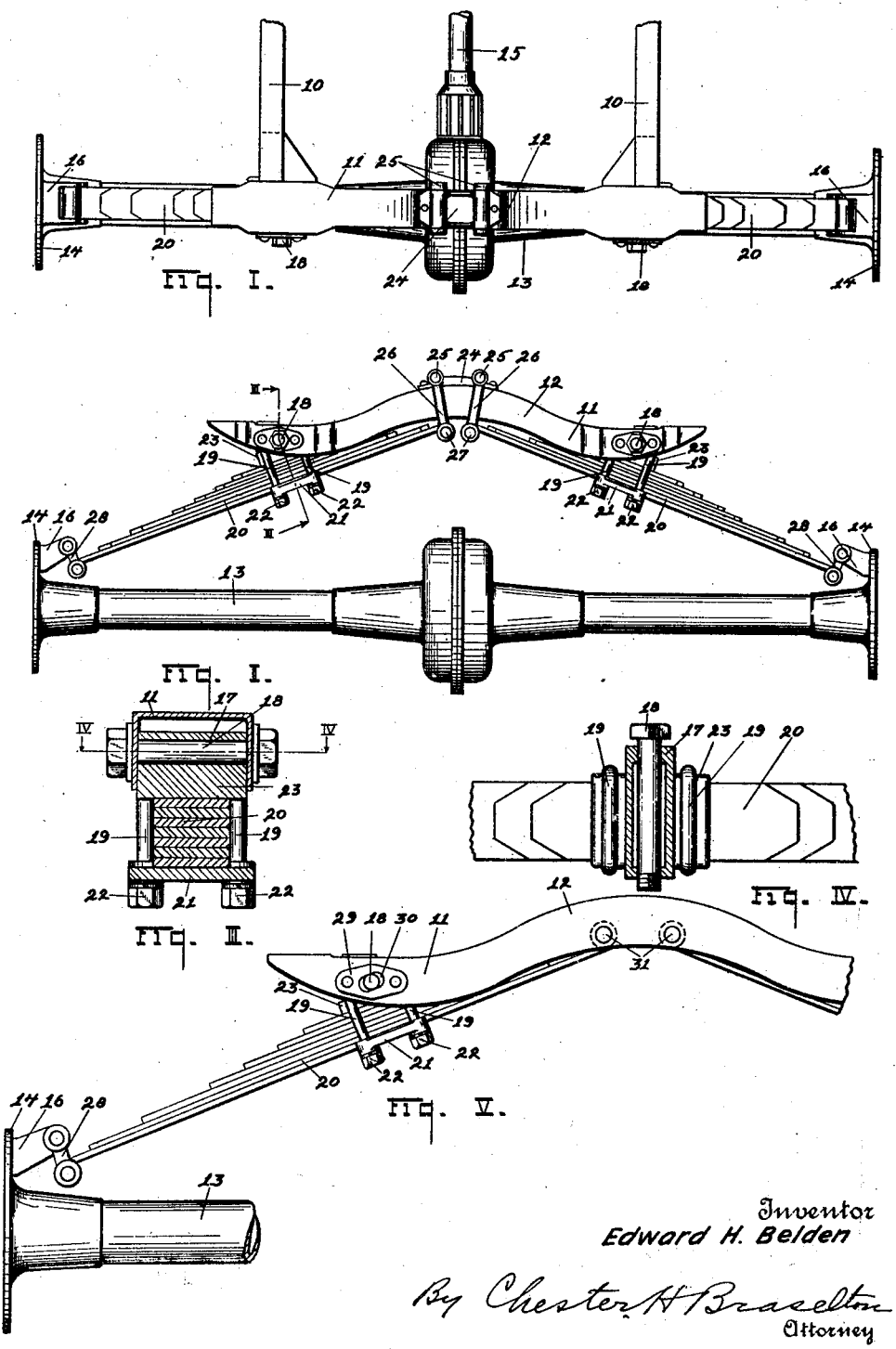

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

SPRING SUSPENSION.

1,407,916.     Specification of Letters Patent.     Patented Feb. 28, 1922.

Application filed December 7, 1917. Serial No. 205,965.

*To all whom it may concern:*

Be it known that I, EDWARD H. BELDEN, a citizen of the United States, residing at Toledo, in the county of Lucas and State of Ohio, have invented certain new and useful Improvements in Spring Suspensions, of which I declare the following to be a full, clear, and exact description.

This invention relates to improvements in spring suspension for motor vehicles.

The principal object of this invention is to provide an improved spring suspension for motor vehicles, which is very simple and economical in construction and which involves a true cantilever spring construction.

A further object of my invention is to provide a spring construction for vehicles, embodying a true cantilever construction, in which straight cantilever springs are used, lying normally substantially in the vertical plane of the axle to which they are connected.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawings, forming a part of this specification, in which—

Fig. I is a top plan view of the rear end of a motor vehicle chassis, showing a spring suspension embodying my invention.

Fig. II is a view in rear elevation of the spring construction shown in Fig. I.

Fig. III is a detail, sectional view, taken substantially on the line III—III of Fig. II.

Fig. IV is a detail, sectional view, taken substantially on the line IV—IV of Fig. III, omitting the frame member.

Fig. V is an enlarged, fragmentary view, similar to Fig. II, but showing a modified construction.

In the drawings, similar reference numerals refer to similar parts throughout the several views, and the sectional views are taken looking in the direction of the little arrows at the ends of the section lines.

Considering the numbered parts of the drawing, I have shown a motor vehicle frame embodying the side members 10 connected by the cross member 11, which may be crowned upwardly in the center, as at 12. A rear axle 13 has the flanges 14 at each end thereof, from which the arms 16 project inwardly. Rear axle 13 is connected with the torque tube 15 in the usual manner, said torque tube housing the propeller shaft for driving the rear axle.

A pair of straight cantilever springs 20 are provided for connecting the frame and the axle. A block 23 is disposed in engagement with the upper surface of each spring 20, near the center thereof, and secured thereto by means of the shackle bolts 19, which embrace the block 23 and the spring 20, with their ends passing through a plate 21 abutting the under surface of the spring, said plate being held in place by means of the nuts 22. The block 23 has a transverse boss 17, on its upper surface, which boss is normally disposed between the side walls of the channel-shaped frame member 11, as shown in Fig. III of the drawing. A bolt 18 passes through the side walls of the frame member 11 and through the boss 17, by means of which the block 23 is pivotally connected to the frame member. A block 24 is secured to the upper surface of the central crowned part 12 of the cross member 11, and said block 24 carries the pins 25 to which are pivotally connected the links 26, the lower end of each of said links being pivotally connected by a pin 27 to the inner end of one of the cantilever springs 20. The outer end of each cantilever spring 20 is connected by means of links 28 to one of the arms 16, extending from the flanges 14.

In Fig. V, I have shown a similar arrangement except that the pin 18 carried by the block 23, which is fastened to the spring 20 by means of the shackle bolts 19, has its ends disposed in slots 30 formed in the side walls of the cross member 11, and in plates 29 attached thereto. A slight movement of the block 23 relative to the cross member 11 is thus permitted. The inner end of each spring 20 is pivotally connected to the central part 12 of the cross member 11 by means of the pins 31. The outer end of each spring is connected to the axle through the links 28 and the arms 16, as in the preferred form of my device.

From the description of the parts given above, the operation of this device should be very readily understood. The cantilever springs 20 are supported from the frame member 11 through the blocks 23 and the shackle bolts 19. This connection, due to the pins 18, is such as to permit a slight rocking of the springs relative to the frame member. The inner ends of the spring are connected to the frame member through the links 26, which again permit a slight rocking of the springs relative to the frame member, and the outer ends of the springs are connected to the axle through the links 28 so as to permit a rocking movement of the springs relative to the axle. This construction gives a true cantilever spring construction in which are combined features of great durability and very easy riding qualities. At the same time, this spring suspension may be very easily constructed, and is of such a nature that the removal of the springs, and their disconnection from the frame or the axle, is not at all difficult.

The form of my invention shown in Fig. V is very similar to that shown in the other views, with the exception that the shackles 26 are eliminated and the inner ends of the springs are pivotally connected to the cross member 11 of the frame through the pins 31. In order to give the necessary flexibility and allow a slight movement, pins 18 on the blocks 23 move in slots 30 in the side walls of the cross member 11, so that the elimination of the links 26 does not interfere with the flexibility of the spring.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. A spring suspension for motor vehicles, comprising the combination of an axle; a frame including a cross member; a pair of cantilever springs connected at their ends to said axle, adjacent the ends thereof; a block connected to the central part of each spring, and slidably connected to an end of said cross member; and means pivotally connecting the inner ends of said springs to the central part of said cross member.

2. A spring suspension for vehicles comprising an axle, a frame including a rigid cross member, a pair of cantilever springs, each of said springs being pivotally connected to the axle adjacent one end thereof and pivotally connected to the cross member at a point adjacent the opposite end of the spring, and means for pivotally and slidably supporting the central portion of each spring from the cross member at a point near one end of the cross member.

3. A spring suspension for vehicles comprising an axle, a frame including a cross member, a pair of cantilever springs, each of said springs being pivotally connected to the axle adjacent one end thereof and pivotally connected to the cross member at a point adjacent the opposite end of the spring, and means for pivotally and slidably supporting the central portion of each spring from the cross member at a point near one end of the cross member.

4. A spring suspension for vehicles comprising an axle, a transverse member and a pair of cantilever springs for resiliently supporting the frame from the axle, each of which is pivotally and slidably supported intermediate its ends from the said transverse member.

5. A spring suspension for vehicles comprising an axle, a transverse member and a pair of cantilever springs for resiliently supporting the frame from the axle, each of which is pivotally and slidably supported intermediate its ends from the said transverse member, the ends of each spring being connected to the axle and transverse member.

6. A spring suspension for vehicles comprising an axle, a frame including a cross member provided with a channel formed in the lower face thereof, a pair of cantilever springs connecting said frame and axle, and means within the channel portion of the cross member for slidably supporting said springs intermediate their ends.

7. A spring suspension for vehicles comprising an axle, a frame including a cross member, a pair of cantilever springs for resiliently supporting the cross member from the axle, means for pivotally securing each spring to the cross member and axle respectively, and means for pivotally and slidably connecting the springs to the cross member.

In testimony whereof, I affix my signature.

EDWARD H. BELDEN.